US012518904B2

(12) United States Patent
Honda et al.

(10) Patent No.: US 12,518,904 B2
(45) Date of Patent: Jan. 6, 2026

(54) COIL COMPONENT

(71) Applicant: Murata Manufacturing Co., Ltd., Kyoto-fu (JP)

(72) Inventors: Hiroyuki Honda, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 925 days.

(21) Appl. No.: 17/712,442

(22) Filed: Apr. 4, 2022

(65) Prior Publication Data

US 2022/0319754 A1 Oct. 6, 2022

(30) Foreign Application Priority Data

Apr. 5, 2021 (JP) ................................ 2021-064359

(51) Int. Cl.

*H01F 17/04* (2006.01)
*H01F 27/28* (2006.01)
*H01F 27/29* (2006.01)
*H01F 27/30* (2006.01)

(52) U.S. Cl.

CPC ....... *H01F 17/045* (2013.01); *H01F 27/2823* (2013.01); *H01F 27/292* (2013.01); *H01F 27/306* (2013.01)

(58) Field of Classification Search

CPC .................................................... H01F 17/045
USPC .................................................... 336/83, 221
See application file for complete search history.

(56) References Cited

U.S. PATENT DOCUMENTS

| | | | | |
|---|---|---|---|---|
| 2006/0196984 A1* | 9/2006 | Higeta | H01F 41/069 | 242/472.8 |
| 2019/0378653 A1* | 12/2019 | Sukegawa | H05K 1/181 | |
| 2020/0211752 A1 | 7/2020 | Sato et al. | | |

FOREIGN PATENT DOCUMENTS

| | | |
|---|---|---|
| CN | 107275041 A | 10/2017 |
| CN | 111430127 A | 7/2020 |
| JP | 2017-188568 A | 10/2017 |
| JP | 2019-134065 A | 8/2019 |
| JP | 2020-107653 A | 7/2020 |
| JP | 2020-107861 A | 7/2020 |

OTHER PUBLICATIONS

English translon of JP2009182055 (Year: 2009).*

* cited by examiner

*Primary Examiner* — Ronald Hinson

(74) *Attorney, Agent, or Firm* — Studebaker Brackett PLLC

(57) ABSTRACT

A coil component includes a core having a winding core portion and a coil wound along an axis of the winding core portion and including a plurality of wires. The coil has a wound region in which the plurality of wires are wound around the winding core portion. The wound region includes a twisted wire portion in which the plurality of wires are twisted together and a parallel portion in which the plurality of wires are not twisted together and extend parallel to each other.

10 Claims, 7 Drawing Sheets

COIL COMPONENT

CROSS-REFERENCE TO RELATED APPLICATION

This application claims benefit of priority to Japanese Patent Application No. 2021-064359, filed Apr. 5, 2021, the entire content of which is incorporated herein by reference.

BACKGROUND

Technical Field

The present disclosure relates to a coil component.

Background Art

Japanese Unexamined Patent Application Publication No. 2017-188568 describes a coil component of the related art. The coil component includes a core having a winding core portion and a coil that is wound around the winding core portion and includes a plurality of wires. The coil includes a twisted wire portion in which the plurality of wires are twisted together. The twisted wire portion is continuously wound around the winding core portion for a plurality of turns and forms a first layer and is wound continuously from the first layer for a plurality of turns on top of the first layer and forms a second layer.

Good mode conversion characteristics can be ensured in the coil component of the related art described above. However, since the twisted wire portion is wound around the winding core portion, dead spaces tend to occur between adjacent turns in the twisted wire portion. In addition, in the twisted wire portion, the wires tend to be more loosely wound and dead spaces are even more likely to occur between adjacent turns in the twisted wire portion. Thus, it is difficult to tightly wind the twisted wire portion around the winding core portion, it is difficult to increase the number of turns of the coil, and it is difficult to obtain a high inductance value. In particular, when the twisted wire portion is formed in two layers, the dead spaces are further increased, it is difficult to increase the number of turns of the coil, and it is difficult to obtain a high inductance value.

SUMMARY

Accordingly, the present disclosure provides a coil component that can improve an inductance value while ensuring mode conversion characteristics.

An aspect of the present disclosure provides a coil component that includes a core having a winding core portion and a coil wound along an axis of the winding core portion and including a plurality of wires. The coil has a wound region in which the plurality of wires are wound around the winding core portion. The wound region includes a twisted wire portion in which the plurality of wires are twisted together and a parallel portion in which the plurality of wires are not twisted together and extend parallel to each other.

According to this aspect, since the wound region includes the parallel portion, the wires can be tightly wound around the winding core portion, and consequently, the number of turns of the coil around the winding core portion can be increased and the inductance value can be improved. Furthermore, the mode conversion characteristics can be ensured since the wound region includes the twisted wire portion.

In the coil component, the twisted wire portion is preferably continuously wound through at least one turn around the winding core portion and a number of twists of the twisted wire portion continuously wound through at least one turn around the winding core portion is preferably one or more.

"The number of twists is 1" refers to a state where a plurality of wires extend from a particular relative position on the wires up to the point where the wires first return to the next same relative position in a state where the plurality of wires are twisted together. In other words, it refers to a state where the positional relationship between the plurality of wires twisted together is rotated from 0° to 360°.

With this configuration, the mode conversion characteristics can be improved compared with a case where the twisted wire portion is continuously wound through ½ a turn around the winding core portion and a case in which the number of twists of the twisted wire portion continuously wound around the winding core portion is ½.

In the coil component, the parallel portion is preferably continuously wound through at least one turn around the winding core portion.

With this configuration, the number of turns of the coil around the winding core portion can be further increased and the inductance value can be further improved compared with the case where the parallel portion is continuously wound through ½ a turn around the winding core portion.

In the coil component, a number of twists of the twisted wire portion in the coil as a whole is preferably a natural number.

With this configuration, the number of twists of the twisted wire portion across the whole coil is a natural number and therefore the plurality of wires in the twisted wire portion can be symmetrically disposed across the whole coil. This enables capacitance components of the twisted wire portion to be more sufficiently canceled out and the mode conversion characteristics to be improved.

In the coil component, the core preferably includes a first flange portion provided at a first end of the winding core portion and a second flange portion provided at a second end of the winding core portion. The coil component preferably further includes a plurality of electrode portions provided on the first flange portion and connected to the coil and a plurality of electrode portions provided on the second flange portion and connected to the coil. In the wound region, at least part of the twisted wire portion is preferably located at a position nearest at least one out of the first end and the second end of the winding core portion.

With this configuration, since at least part of the twisted wire portion is located at a position nearest at least one out of the first end and the second end of the winding core portion, a difference in capacitance between the first wire and the second wire in the part near the electrode portions can be made smaller. This enables stray capacitances between the twisted wire portion and the electrode portions to be reduced and enables the mode conversion characteristics to be improved.

In the coil component, the core preferably includes a first flange portion provided at a first end of the winding core portion and a second flange portion provided at a second end of the winding core portion. The coil component preferably further includes a plurality of electrode portions provided on the first flange portion and connected to the coil and a plurality of electrode portions provided on the second flange portion and connected to the coil. In the wound region, at least part of the parallel portion is preferably located at a position nearest at least one out of the first end and the second end of the winding core portion.

With this configuration, since at least part of the parallel portion is located at a position nearest at least one out of the first end and the second end of the winding core portion, the plurality of wires can be disposed in a non-twisted state between the electrode portions and an end portion of the winding core portion where the parallel portion is located. This makes it possible to make the lengths of the wires led out to the electrode portions from the end portion of the winding core portion constant for each product and to suppress variations in characteristics among the products.

Furthermore, looser winding of the wires resulting from the plurality of wires being twisted together between the end portion of the winding core portion and the electrode portions can be reduced, and the occurrence of contact between solder and the wires led out from the end portion of the winding core portion to the electrode portions can be reduced when mounting the coil component on a mounting substrate.

Furthermore, the plurality of wires can be twisted together after winding the wires around the end portion of the winding core portion without twisting the wires together between the end portion of the winding core portion and the electrode portions. This allows the position at which twisting of the plurality of wires is started to be stabilized.

In the coil component, the core preferably includes a first flange portion provided at a first end of the winding core portion and a second flange portion provided at a second end of the winding core portion. The coil component preferably further includes a plurality of electrode portions provided on the first flange portion and connected to the coil and a plurality of electrode portions provided on the second flange portion and connected to the coil. In the wound region, the twisted wire portion and the parallel portion are preferably arrayed in an alternating manner along the axis.

In this configuration, the twisted wire portion and the parallel portion are arrayed in an alternating manner along the axis, and therefore the wire capacitances of the individual turns can be made more uniform, the mode conversion characteristics can be improved, the wires can be more tightly wound around the winding core portion, and the inductance value can be further improved.

In the coil component, the parallel portion preferably includes a first wire and a second wire not twisted together and extending parallel to each other, and in the wound region, one out of the first wire and the second wire forming a certain turn in at least part of the parallel portion is preferably wound around the winding core portion and forms a first layer, and another one out of the first wire and the second wire forming the certain turn is preferably wound on top of the first layer and forms a second layer.

With this configuration, the parts of the first wire and the second wire forming the same turn in at least part of the parallel portion form two layers, and therefore the number of turns of the coil can be increased and the inductance value can be further improved.

In the coil component, in the wound region, the twisted wire portion is preferably continuously wound through a plurality of turns around the winding core portion and forms a first layer and is preferably continuously wound through a plurality of turns on top of the first layer and forms a second layer.

With this configuration, the twisted wire portion has a two-layer structure, and therefore the number of turns of the coil can be increased and the inductance value can be further improved.

In the coil component, in the wound region, either one out of the twisted wire portion and the parallel portion is preferably continuously wound through a plurality of turns around the winding core portion and forms a first layer, and another one out of the twisted wire portion and the parallel portion is preferably continuously wound through a plurality of turns on top of the first layer and forms a second layer.

In this configuration, the twisted wire portion and the parallel portion form a two-layer structure and therefore the number of turns of the coil can be increased and the inductance value can be further improved. In addition, the twisted wire portion and the parallel portion can be increased and the mode conversion characteristics can be improved while increasing the number of turns of the coil.

In the coil component, the core preferably includes a first flange portion provided at a first end of the winding core portion and a second flange portion provided at a second end of the winding core portion. The coil component preferably further includes a first electrode portion and a second electrode portion provided on the first flange portion and a third electrode portion and a fourth electrode portion provided on the second flange portion. The coil preferably includes a first wire electrically connected to the first electrode portion and the third electrode portion and a second wire electrically connected to the second electrode portion and the fourth electrode portion. When viewed in a direction along the axis, the first electrode portion and the second electrode portion are preferably symmetrically disposed with respect to a center position in a lateral width of the first flange portion and the first wire and the second wire are preferably led out to the first electrode portion and the second electrode portion from the center position in the lateral width of the first flange portion of the winding core portion. When viewed in a direction along the axis, the third electrode portion and the fourth electrode portion are preferably symmetrically disposed with respect to a center position in a lateral width of the second flange portion and the first wire and the second wire are preferably led out to the third electrode portion and the fourth electrode portion from the center position in the lateral width of the second flange portion of the winding core portion.

With this configuration, the lead out length of the first wire from the winding core portion to the first electrode portion and the lead out length of the second wire from the winding core portion to the second electrode portion can be made the same as each other, the lead out length of the first wire from the winding core portion to the third electrode portion and the lead out length of the second wire from the winding core portion to the fourth electrode portion can be made the same as each other, and the mode conversion characteristics can be further improved.

In the coil component according to an aspect of the present disclosure, the inductance value can be improved while ensuring mode conversion characteristics.

DETAILED DESCRIPTION

Hereafter, coil components according to aspects of the present disclosure will be described in detail while referring to the illustrated embodiments. The drawings include schematic drawings and does not reflect the actual dimensions and proportions in some cases.

First Embodiment

Figure 1:
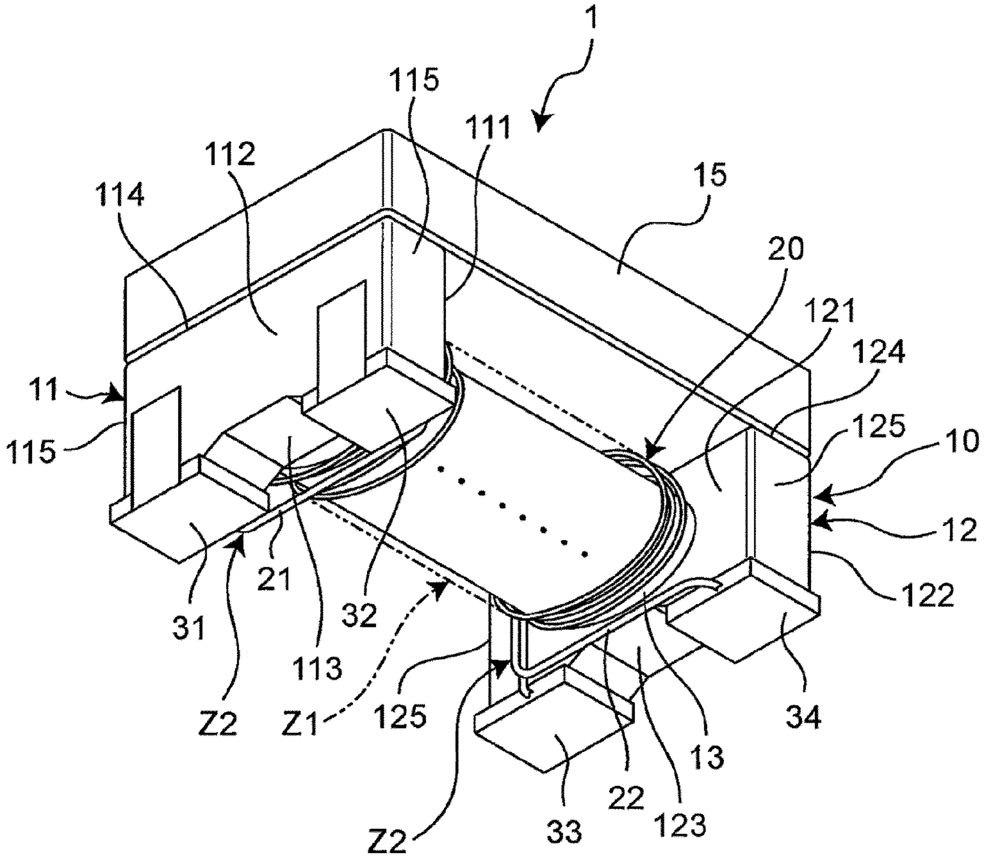
FIG. 1 is a perspective view seen from a lower surface side and illustrating a coil component of First Embodiment.

FIG. 1 is a perspective view seen from a lower surface side and illustrating a coil component of First Embodiment. As illustrated in FIG. 1, a coil component 1 includes a core 10, a coil 20 wound around the core 10, a first electrode portion 31, a second electrode portion 32, a third electrode portion 33, and a fourth electrode portion 34 serving as outer terminals provided on the core 10 and electrically connected to the coil 20, and a plate member 15 attached to the core 10. Note that part of the coil 20 is illustrated in a simplified manner in FIG. 1 for the sake of convenience.

The core 10 includes a winding core portion 13 shaped so as to extend in a certain direction and around which the coil 20 is wound, a first flange portion 11 provided at a first end of the winding core portion 13 in an extension direction in which the winding core portion 13 extends and projecting in directions perpendicular to the extension direction, and a second flange portion 12 provided at a second end of the winding core portion 13 in the extension direction in which the winding core portion 13 extends and projecting in directions perpendicular to the extension direction. As the material of the core 10, for example, a magnetic material such as sintered ferrite or a molded body of a resin containing a magnetic powder is preferably used, but a non-magnetic material such as alumina or resin may also be used. The shape of the winding core portion 13 in a cross section perpendicular to the direction in which the winding core portion 13 extends may be a quadrangular shape or another polygonal shape or may be a circular shape, an oval shape, or an appropriate combination of such shapes. Hereafter, it is assumed that the lower surface of the core 10 is a surface that is to be mounted on a mounting substrate and that the surface of the core 10 on the opposite side from the lower surface is the upper surface of the core 10.

The first flange portion 11 has an inner surface 111 that faces towards the winding core portion 13, an outer surface 112 that faces towards the opposite side from the inner surface 111, a lower surface 113 that connects the inner surface 111 and the outer surface 112 to each other, an upper surface 114 that faces towards the opposite side from the lower surface 113, and two side surfaces 115 that connect the inner surface 111 and the outer surface 112 to each other and connect the lower surface 113 and the upper surface 114 to each other.

Similarly, the second flange portion 12 has an inner surface 121 that faces towards the winding core portion 13, an outer surface 122 that faces towards the opposite side from the inner surface 121, a lower surface 123, an upper surface 124, and two side surfaces 125. The lower surface 123, the upper surface 124, and the side surfaces 125 of the second flange portion 12 respectively face in the same directions as the lower surface 113, the upper surface 114, and the side surfaces 115 of the first flange portion 11. Note that the terms "lower surface" and "upper surface" are for explanatory purposes only and do not necessarily correspond to vertically down and up directions in reality.

The plate member 15 is attached to the upper surface 114 of the first flange portion 11 and the upper surface 124 of the second flange portion 12 with an adhesive. The material of the plate member 15 is the same as that of the core 10, for example. When the core 10 and the plate member 15 are both made of a magnetic material, a closed magnetic loop is formed and the efficiency with which inductance is attained is improved. The plate member 15 has, for example, a length of about 3.2 mm, a width of about 2.5 mm, and a thickness of about 0.7 mm.

The first flange portion 11 has two foot parts on a lower surface 113 side thereof, and the first electrode portion 31 is provided on one of the foot parts and the second electrode portion 32 is provided on the other of the foot parts. The first electrode portion 31 and the second electrode portion 32 are each provided in a continuous manner along the outer surface 112 and the lower surface 113. The parts of the first electrode portion 31 and the second electrode portion 32 provided on the outer surface 112 include, for example, a NiCr layer, a NiCu layer, a Cu layer, a Ni layer, and a Sn layer. The parts of the first electrode portion 31 and the second electrode portion 32 provided on the lower surface 113 include, for example, a Ag layer, a Cu layer, a Ni layer, and a Sn layer.

The second flange portion 12 has two foot parts on a lower surface 123 side thereof, and the third electrode portion 33 is provided on one of the foot parts that is on the same side as the foot part on which the first electrode portion 31 is provided and the fourth electrode portion 34 is provided on the other of the foot parts that is on the same side as the foot part on which the second electrode portion 32 is provided. The third electrode portion 33 and the fourth electrode portion 34 are each provided in a continuous manner along the outer surface 122 and the lower surface 123.

As illustrated in FIG. 1, the lower surface 113 of the first flange portion 11 and the lower surface 123 of the second flange portion 12 each refer to a region extending from lower surface parts of the foot parts to a lower surface part of a branching part along inclined surface parts of the branching part between the foot parts. When collectively describing the first electrode portion 31, the second electrode portion 32, the third electrode portion 33, and the fourth electrode portion 34, the electrode portions may be referred to as "electrode portions 31 to 34".

The coil 20 has a wound region Z1 in which the coil 20 is wound around the winding core portion 13 and non-wound regions Z2 in which the coil 20 is not wound around the winding core portion 13. More specifically, the non-wound regions Z2 are located on both sides of the wound region Z1 and are the regions where the coil 20 separates from the winding core portion 13 and is connected to the electrode portions 31 to 34.

The coil 20 includes a first wire 21 and a second wire 22, which are wound along an axis of the winding core portion 13. That is, a coil axis of the coil 20 is aligned with the direction in which the winding core portion 13 extends (axis of winding core portion 13). The first wire 21 and the second wire 22 are insulating-film-coated conducting wires in each of which a conducting wire composed of a metal such as copper (for example, conductor diameter φ: 0.020 mm to 0.080 mm) is covered by a film composed of a resin such as polyurethane, imide-modified polyurethane, polyesterimide, or polyamide-imide.

A first end of the first wire 21 is electrically connected to the first electrode portion 31 and a second end of the first wire 21 is electrically connected to the third electrode portion 33. A first end of the second wire 22 is electrically connected to the second electrode portion 32 and a second end of the second wire 22 is electrically connected to the fourth electrode portion 34. The first wire 21 and the second wire 22 are connected to the electrode portions 31 to 34 by, for example, thermocompression bonding, brazing, or welding.

The first wire 21 and the second wire 22 are wound in the same direction around the winding core portion 13. Thus, in the coil component 1, when signals of opposite phases such as differential signals are input to the first wire 21 and the second wire 22, the magnetic fluxes generated by the first wire 21 and the second wire 22 cancel each other out, and as a result the function as an inductor is weakened and the signals are able to pass. On the other hand, when signals of the same phase such as external noise are input to the first wire 21 and the second wire 22, the magnetic fluxes generated by the first wire 21 and the second wire 22 reinforce each other, the function as an inductor is strengthened, and passage of the noise is blocked. Therefore, the coil component 1 functions as a common mode choke coil in which common mode signals such as external noise are attenuated while pass loss of differential mode signals such as differential signals is reduced.

When the coil component 1 is mounted on a mounting substrate, the lower surface 113 of the first flange portion 11 and the lower surface 123 of the second flange portion 12 face the mounting substrate. At this time, a direction in which the winding core portion 13 extends from the first end to the second end thereof (axis of the winding core portion 13) and the main surfaces of the mounting substrate are parallel to each other. In other words, the coil component 1 is a horizontal winding type coil component in which the coil axes of the first wire 21 and the second wire 22 are parallel to the mounting substrate.

Figure 2A:
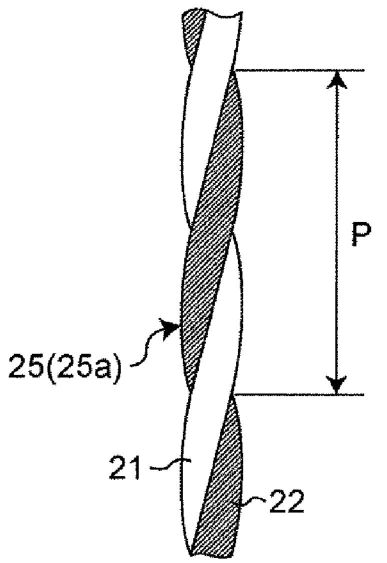
FIG. 2A is an enlarged view of a Z-twist twisted wire portion.
Figure 2B:
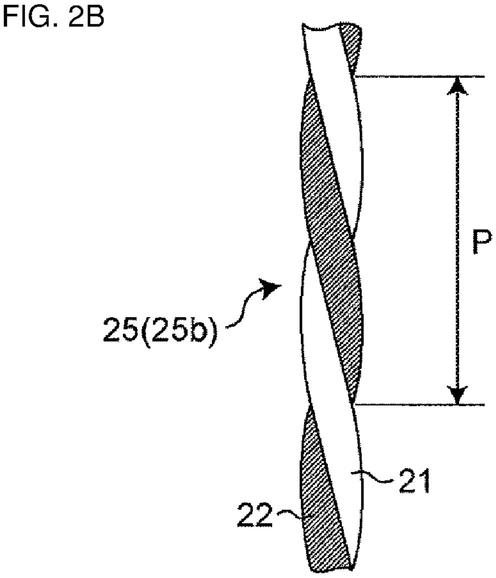
FIG. 2B is an enlarged view of an S-twist twisted wire portion.

The coil 20 has a twisted wire portion 25 in which the first wire 21 and the second wire 22 are twisted together. FIGS. 2A and 2B are enlarged views of the twisted wire portion 25. In FIGS. 2A and 2B, the second wire 22 is shaded for convenience. FIG. 2A illustrates a Z-twist twisted wire portion 25*a* and FIG. 2B illustrates an S-twist twisted wire portion 25*b*. The twisting direction of the Z-twist twisted wire portion 25*a* and the twisting direction of the S-twist twisted wire portion 25*b* are opposite to each other. "Twisting direction" refers to the direction of rotation of the first wire 21 and the second wire 22 twisted together.

As illustrated in FIGS. 2A and 2B, the twisted wire portion 25 is a part where the first wire 21 and the second wire 22 are twisted together. In the twisted wire portion 25, since relative differences (differences in path length, stray capacitance, and so on) between the two wires are small, mode conversion output such as when differential mode signals are converted into common mode signals inside the coil component 1 and then output or vice versa is reduced and good mode conversion characteristics can be realized.

In the twisted wire portion 25 in FIGS. 2A and 2B, the first wire 21 and the second wire 22 are twisted so as to closely contact each other, but there may be places where the first wire 21 and the second wire 22 are separated from each other or the first wire 21 and the second wire 22 may be twisted so as to be separated from each other along their entire lengths. In the coil 20, the twisting direction of the twisted wire portion 25 may be that of a Z twist, may be that of an S twist, or there may be a mixture of Z twists and S twists as described later.

As illustrated in FIGS. 2A and 2B, a twisting pitch P of the twisted wire portion 25 refers to the length from a particular relative position on the first wire 21 and the second wire 22 to the point at which the first wire 21 and the second wire 22 first return to the next same relative position in a state where the first wire 21 and the second wire 22 are twisted together. In other words, the twisting pitch P refers to a length corresponding to when the positional relationship between a plurality of wires twisted together is rotated from 0° to 360°.

Furthermore, regarding the number of twists of the twisted wire portion 25, the number of twists is 1 when the positional relationship between the first wire 21 and the second wire 22, which are twisted together, is rotated through 360°. For example, for the two wires 21 and 22, the number of twists is ½ when the positional relationship between the wires is rotated by 180°, i.e., when the two wires 21 and 22 just swap places, and the number of twists is 1 when the positional relationship between the wires is rotated by a further 180°, i.e., when the positional relationship between the two wires 21 and 22 returns to the original relationship.

Figure 3:
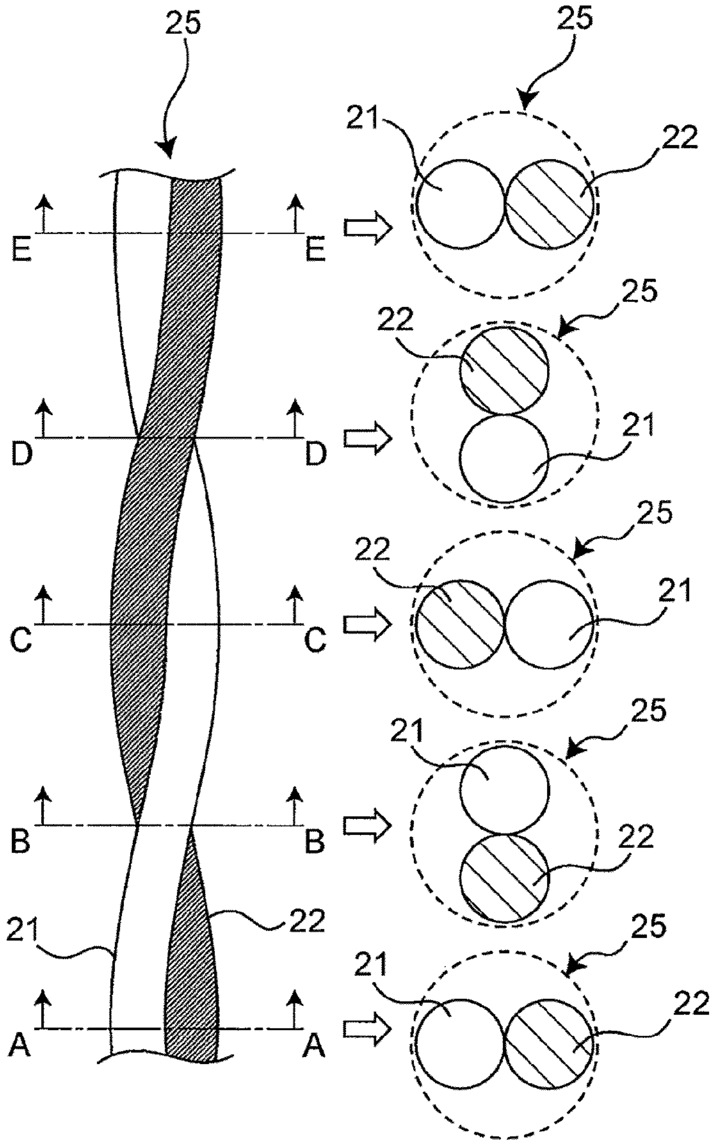
FIG. 3 is an explanatory diagram for describing cross sections of the twisted wire portion taken at prescribed positions.

FIG. 3 is an explanatory diagram for describing cross sections of the twisted wire portion 25 taken at prescribed positions. As illustrated in FIG. 3, the number of twists from the position of a cross section A-A to the position of a cross section B-B is ¼, the number of twists from the position of the cross section A-A to the position of a cross section C-C is ½, the number of twists from the position of the cross section A-A to the position of a cross section D-D is ¾, and the number of twists from the position of the cross section A-A to the position of a cross section E-E is 1.

Since the structures of the first wire 21 and the second wire 22 of the twisted wire portion 25 at the position of the cross section A-A are symmetrical to the structures of the first wire 21 and the second wire 22 of the twisted wire portion 25 at the position of the cross section C-C, the capacitances between the wires cancel each other out. Similarly, since the structures of the first wire 21 and the second wire 22 of the twisted wire portion 25 at the position of the cross section B-B are symmetrical to the structures of the first wire 21 and the second wire 22 of the twisted wire portion 25 at the position of the cross section D-D, capacitances between the wires cancel each other out. Thus, the first wire 21 and second wire 22 are symmetrically disposed when the number of twists of the twisted wire portion 25 is 1, and the capacitances formed between the symmetrical wires cancel each other out and the mode conversion characteristics can be improved.

Figure 4:
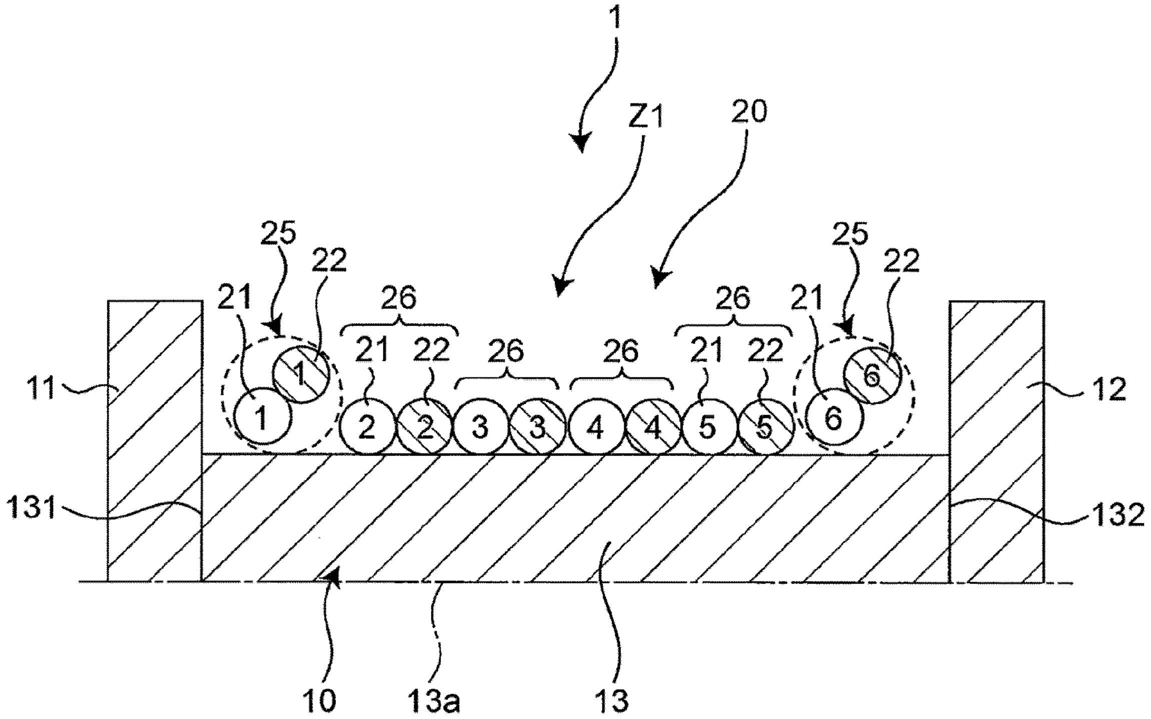
FIG. 4 is a simplified sectional view of the coil component.

FIG. 4 is a simplified sectional view of the coil component 1. FIG. 4 is a diagram illustrating part of a cross section containing an axis 13*a* of the winding core portion 13. In FIG. 4, numbers are used to indicate the ordinal turn numbers of the coil 20 counting from the side near a first end 131 of the winding core portion 13. The ordinal turn numbers are not numbers obtained counting in order from the turn nearest the first flange portion 11, but rather numbers that indicate the order in which the turns of the coil 20 have been wound. In this embodiment, the coil 20 is wound through six turns from the first end 131 to a second end 132 of the winding core portion 13.

The wound region Z1 includes the twisted wire portion 25 in which the first wire 21 and the second wire 22 are twisted together and a parallel portion 26 in which the first wire 21 and the second wire 22 are not twisted together and extend parallel to each other. More specifically, the twisted wire portion 25 forms the first turn and the sixth turn and the parallel portion 26 forms the second turn, the third turn, the fourth turn, and the fifth turn. The twisted wire portion 25 and the parallel portion 26 are wound around the winding core portion 13 and form a first layer.

In this configuration, since the wound region Z1 includes the parallel portion 26, the wires 21 and 22 can be tightly wound around the winding core portion 13, and consequently, the number of turns of the coil 20 around the winding core portion 13 can be increased and the inductance value can be improved. In addition, the mode conversion characteristics can be ensured since the wound region Z1 includes the twisted wire portion 25.

It is preferable that the twisted wire portion 25 be continuously wound through at least one turn around the winding core portion 13 and that the number of twists of the twisted wire portion 25 continuously wound through at least one turn around the winding core portion 13 be one or more. With this configuration, the mode conversion characteristics can be improved compared with a case where the twisted wire portion 25 is continuously wound through ½ a turn around the winding core portion 13 and a case where the number of twists of the twisted wire portion 25 continuously wound around the winding core portion 13 is ½.

It is preferable that the parallel portion 26 be continuously wound through at least one turn around the winding core portion 13. With this configuration, the number of turns of the coil around the winding core portion 13 can be further increased and the inductance value can be further improved compared with the case where the parallel portion 26 is continuously wound through ½ a turn around the winding core portion 13.

It is preferable that the number of twists of the twisted wire portion 25 be a natural number across the coil 20 as a whole. With this configuration, the wires 21 and 22 of the twisted wire portion 25 can be disposed symmetrically across the coil 20 as a whole. This enables capacitance components of the twisted wire portion 25 to be more adequately canceled out and enables the mode conversion characteristics to be improved.

As illustrated in FIG. 4, in the wound region Z1 at least part of the twisted wire portion 25 is located at a position nearest at least one out of the first end 131 and the second end 132 of the winding core portion 13. In this embodiment, a first part of the twisted wire portion 25 is located at a position nearest the first end 131 and a second part of the twisted wire portion 25 is located at a position nearest the second end 132. In other words, the first part of the twisted wire portion 25 forms the first turn and the second part of the twisted wire portion 25 forms the sixth turn.

With this configuration, since the first part of the twisted wire portion 25 is located at a position nearest the first end 131, the difference in capacitance between the first wire 21 and the second wire 22 can be reduced in the first part of the twisted wire portion 25 near the first electrode portion 31 and the second electrode portion 32. This enables stray capacitances between the first part of the twisted wire portion 25 and the first and second electrode portions 31 and 32 to be reduced and enables the mode conversion characteristics to be improved. Furthermore, since the second part of the twisted wire portion 25 is located at a position nearest the second end 132, the difference in capacitance between the first wire 21 and the second wire 22 can be reduced in the second part of the twisted wire portion 25 near the third electrode portion 33 and the fourth electrode portion 34. This enables stray capacitances between the second part of the twisted wire portion 25 and the third and fourth electrode portions 33 and 34 to be reduced and enables the mode conversion characteristics to be improved.

At least part of the twisted wire portion 25 may be located at a position nearest the first end 131 or the second end 132. In other words, the twisted wire portion 25 may form the first turn or the sixth turn. In addition, the twisted wire portion 25 forms the first turn and the sixth turn, and may additionally form at least three turns out of the second to fifth turns.

Second Embodiment

Figure 5:
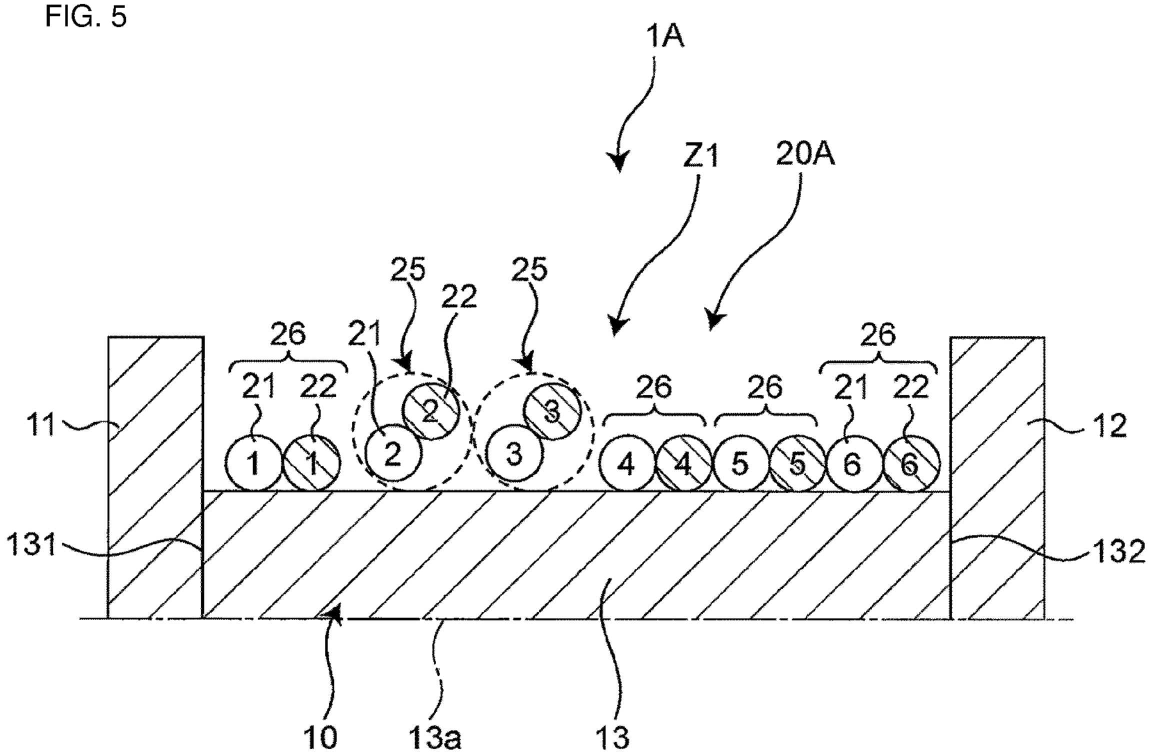
FIG. 5 is a simplified sectional view illustrating a coil component of Second Embodiment.

FIG. 5 is a simplified sectional view illustrating a coil component of Second Embodiment. The Second Embodiment differs from First Embodiment with respect to the configuration of the coil. The differences will be described below. The rest of the configuration is the same as that of First Embodiment, and parts that are the same as in First Embodiment are denoted by the same symbols and description thereof is omitted.

As illustrated in FIG. 5, in a coil component 1A of Second Embodiment, at least part of the parallel portion 26 in the wound region Z1 of a coil 20A is located nearest at least one out of the first end 131 and the second end 132 of the winding core portion 13. In this embodiment, a first part of the parallel portion 26 is located at a position nearest the first end 131 and a second part of the parallel portion 26 is located at a position nearest the second end 132. In other words, the first part of the parallel portion 26 forms the first turn and the second part of the parallel portion 26 forms the sixth turn. In addition, other parts of the parallel portion 26 form the fourth turn and the fifth turn and the twisted wire portion 25 forms the second turn and the third turn.

With this configuration, since the first part of the parallel portion 26 is located at a position nearest the first end 131, the first wire 21 and the second wire 22 can be disposed in a non-twisted state between the first electrode portion 31 and the second electrode portion 32 and the first end 131 of the winding core portion 13 where the first part of the parallel portion 26 is located. This makes it possible to make the lengths of the wires 21 and 22 led out to the first electrode portion 31 and the second electrode portion 32 from the first end 131 of the winding core portion 13 constant for each product and to suppress variations in characteristics among the products.

Furthermore, looser winding of the wires 21 and 22 resulting from the wires 21 and 22 being twisted together can be reduced between the first end 131 of the winding core portion 13 and the first and second electrode portions 31 and 32, and the occurrence of contact between solder and the wires 21 and 22 led out from the first end 131 of the winding core portion 13 to the first and second electrode portions 31 and 32 can be reduced when mounting the coil component 1A on a mounting substrate.

Furthermore, the wires 21 and 22 can be twisted together after winding the wires 21 and 22 around the first end 131 of the winding core portion 13 without twisting the wires 21 and 22 together in the region from the first end 131 of the winding core portion 13 to the first and second electrode portions 31 and 32. This allows the position at which twisting together of the wires 21 and 22 is started to be stabilized when winding the wires 21 and 22 from the first end 131. In particular, a stable winding state can be realized by the first part of the parallel portion 26 being wound through one or more turns.

Similarly, since the second part of the parallel portion 26 is located at a position nearest the second end 132, the first wire 21 and the second wire 22 can be disposed in a non-twisted state between the third electrode portion 33 and the fourth electrode portion 34 and the second end 132 of the winding core portion 13 where the second part of the parallel portion 26 is located. This makes it possible to make the lengths of the wires 21 and 22 led out to the third and fourth electrode portions 33 and 34 from the second end 132 of the winding core portion 13 constant for each product and to suppress variations in characteristics among the products.

Furthermore, looser winding of the wires 21 and 22 resulting from the wires 21 and 22 being twisted together can be reduced between the second end 132 of the winding core portion 13 and the third and fourth electrode portions 33 and 34, and the occurrence of contact between solder and the wires 21 and 22 led out from the second end 132 of the winding core portion 13 to the third and fourth electrode portions 33 and 34 can be reduced when mounting the coil component 1A on a mounting substrate.

At least part of the parallel portion 26 may be located at a position nearest the first end 131 or the second end 132. In other words, the parallel portion 26 may form the first turn or the sixth turn. In addition, the parallel portion 26 forms the first turn and the sixth turn, and may additionally form at least three turns out of the second to fifth turns.

Third Embodiment

Figure 6:
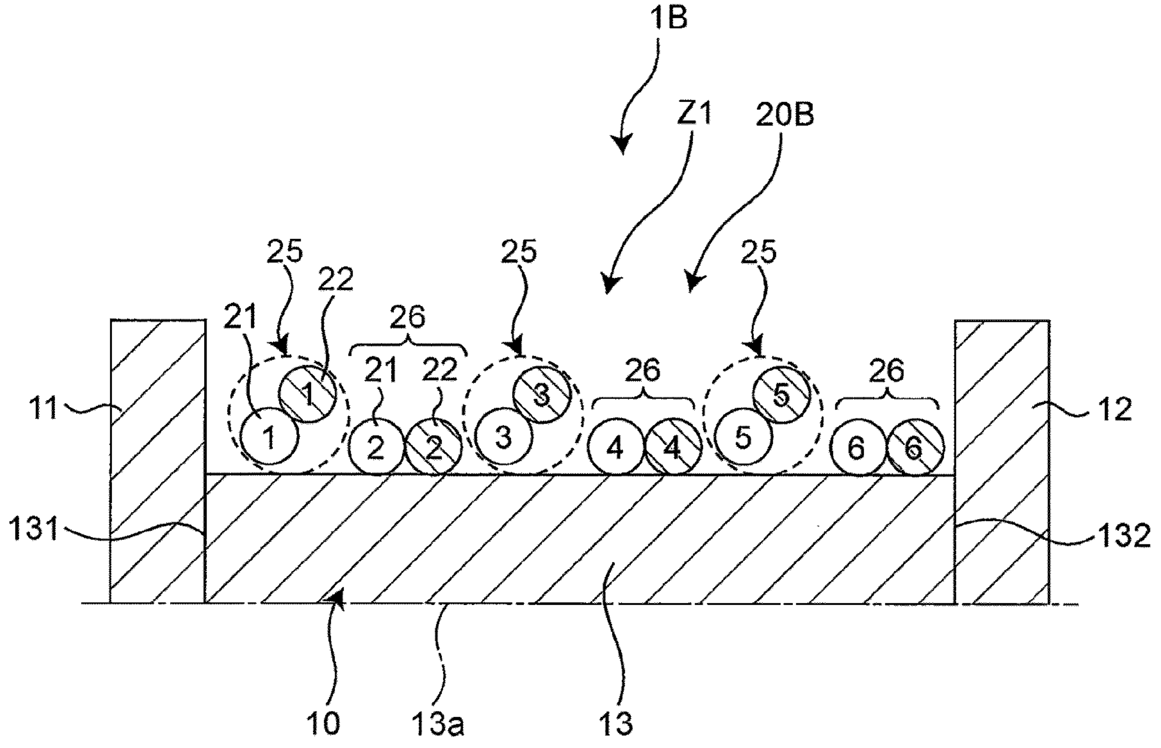
FIG. 6 is a simplified sectional view illustrating a coil component of Third Embodiment.

FIG. 6 is a simplified sectional view illustrating a coil component of Third Embodiment. Third Embodiment differs from First Embodiment with respect to the configuration of the coil. The differences will be described below. The rest of the configuration is the same as that of First Embodiment, and parts that are the same as in First Embodiment are denoted by the same symbols and description thereof is omitted.

As illustrated in FIG. 6, in a coil component 1B of Third Embodiment, the twisted wire portion 25 and the parallel portion 16 are disposed in an alternating manner along the axis 13*a* in the wound region Z1 of a coil 20B. More specifically, the twisted wire portion 25 forms the first turn, the third turn, and the fifth turn and the parallel portion 26 forms the second turn, the fourth turn, and the sixth turn. The twisted wire portion 25 may instead form the second turn, the fourth turn, and the sixth turn and the parallel portion 26 may instead form the first turn, the third turn, and the fifth turn.

In this configuration, the twisted wire portion 25 and the parallel portion 16 are disposed in an alternating manner along the axis 13*a*. The capacitances of the wires 21 and 22 in each turn can be made more uniform, thereby further improving the mode conversion characteristics, and the wires 21 and 22 can be more tightly wound around the winding core portion 13 and the inductance value can be further improved.

Fourth Embodiment

Figure 7A:
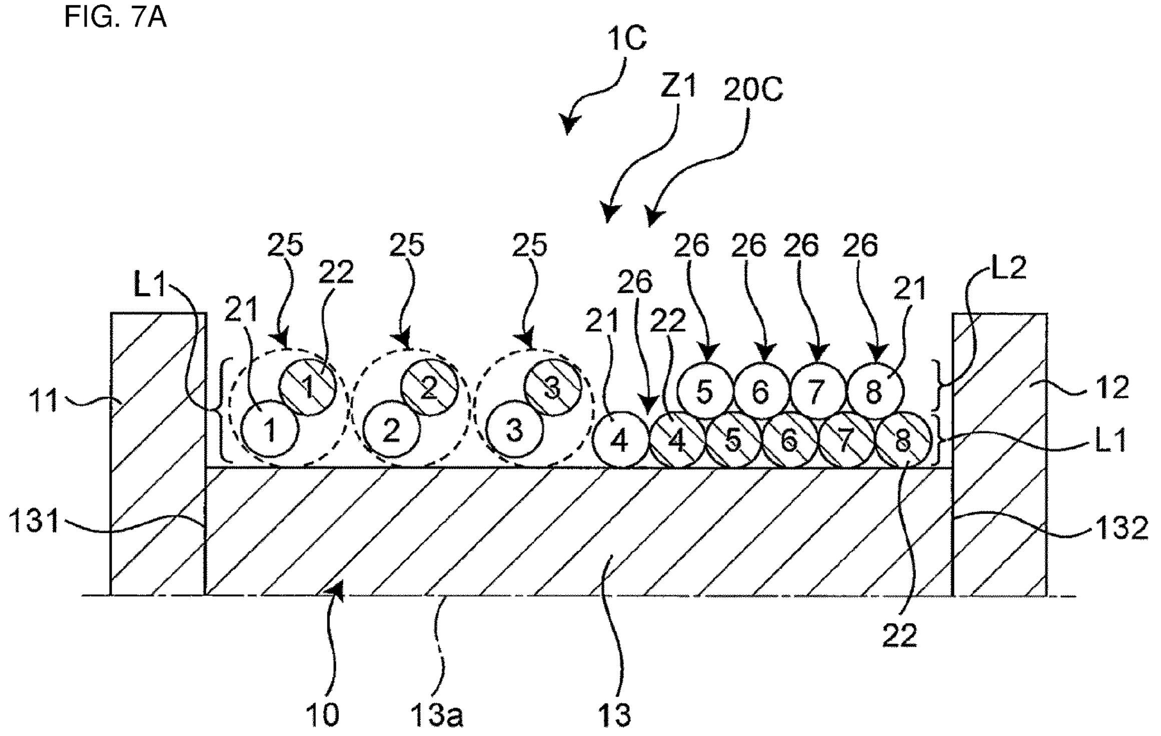
FIG. 7A is a simplified sectional view illustrating a coil component of Fourth Embodiment.

FIG. 7A is a simplified sectional view illustrating a coil component of Fourth Embodiment. Fourth Embodiment differs from First Embodiment with respect to the configuration of the coil. The differences will be described below. The rest of the configuration is the same as that of First Embodiment, and parts that are the same as in First Embodiment are denoted by the same symbols and description thereof is omitted.

As illustrated in FIG. 7A, in a coil component 1C of Fourth Embodiment, the parallel portion 26 includes the first wire 21 and the second wire 22 not twisted together and extending parallel to each other. In the wound region Z1 of a coil 20C, one out of the first wire 21 and the second wire 22 forming a certain turn of at least part of the parallel portion 26 is wound around the winding core portion 13 and forms a first layer L1, and the other one out of the first wire 21 and the second wire 22 forming the same turn is wound on top of the first layer L1 and forms a second layer L2.

More specifically, the parallel portion 26 forms the fourth to eighth turns. The parts of the first and second wires 21 and 22 forming the fourth turn, the part of the second wire 22 forming the fifth turn, the part of the second wire 22 forming the sixth turn, the part of the second wire 22 forming the seventh turn, and the part of the second wire 22 forming the eighth turn form the first layer L1. The part of the first wire 21 forming the fifth turn, the part of the first wire 21 forming the sixth turn, the part of the first wire 21 forming the seventh turn, and the part of the first wire 21 forming the eighth turn form the second layer L2. The twisted wire portion 25 forms the first to third turns and these turns form the first layer L1.

In other words, in a cross section containing the axis 13*a*, the alignment directions of parts of the first wire 21 and the second wire 22 forming the same turns of at least part of the parallel portion 26 are not parallel to the axis 13*a* but rather intersect the axis 13*a*. The alignment directions of the parts of the first wire 21 and the second wire 22 are directions connecting the center of the first wire 21 and the center of the second wire 22. It is preferable that the alignment directions of the parts of the first wire 21 and the second wire 22 be slightly inclined with respect to a direction perpendicular to the axis 13*a*.

More specifically, in a cross section containing the axis 13*a*, the alignment direction of the parts of the first wire 21 and the second wire 22 forming the fifth turn, the alignment direction of the parts of the first wire 21 and the second wire 22 forming the sixth turn, the alignment direction of the parts of the first wire 21 and the second wire 22 forming the seventh turn, and the alignment direction of the parts of the first wire 21 and the second wire 22 forming the eighth turn are parallel to each other and intersect the axis 13*a*. The alignment direction of the parts of the first wire 21 and the second wire 22 forming the fourth turn is parallel to the axis 13*a*.

With this configuration, the parts of the first wire 21 and the second wire 22 forming the same turns in at least part of the parallel portion 26 form two layers, and therefore the number of turns of the coil 20C can be increased and the inductance value can be further improved. The parts of the first wire 21 forming the fifth to eighth turns may form the first layer L1 and the parts of the second wire 22 forming the fifth to eighth turns may form the second layer L2.

Figure 7B:
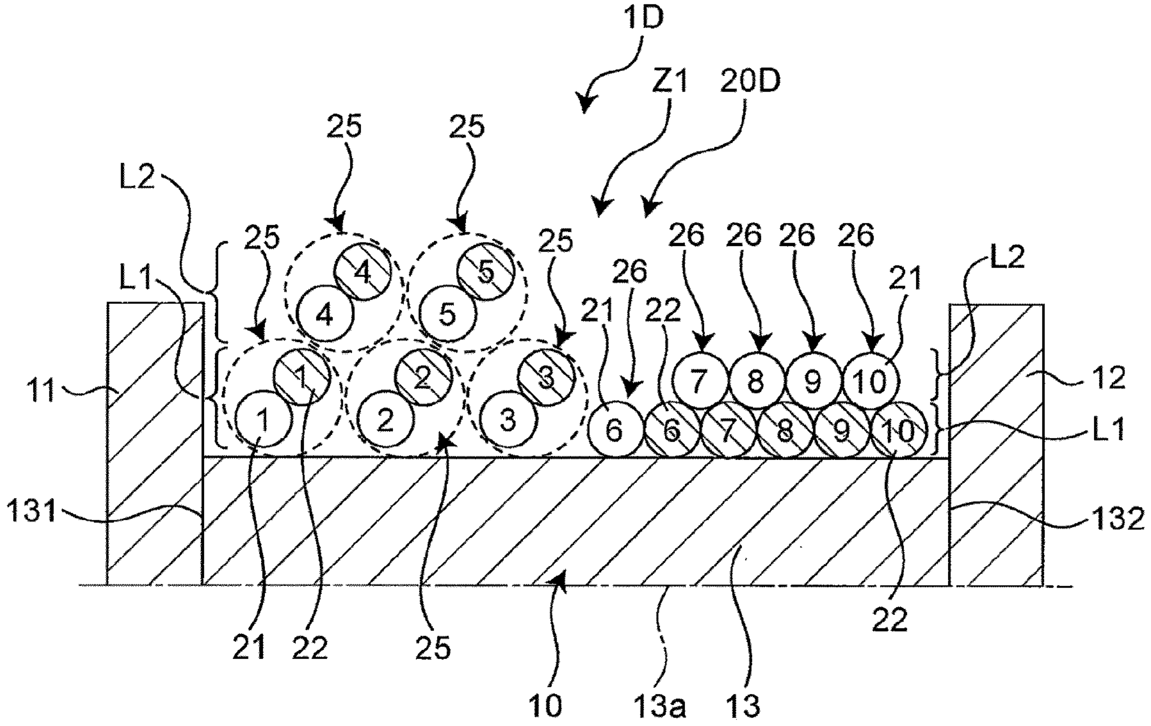
FIG. 7B is a simplified sectional view illustrating a coil component of First Modification.

FIG. 7B is a simplified sectional view illustrating a coil component of First Modification. As illustrated in FIG. 7B, in a coil component ID of First Modification, in addition to the configuration in FIG. 7A, in the wound region Z1 of a coil 20D, the twisted wire portion 25 is continuously wound through a plurality of turns around the winding core portion

13 and forms a first layer L1 and is continuously wound through a plurality of turns on top of the first layer L1 and forms a second layer L2.

More specifically, the twisted wire portion 25 forms the first to fifth turns. The first to third turns form the first layer L1. The fourth and fifth turns form the second layer L2.

In addition, the parallel portion 26 forms the sixth to tenth turns. The parts of the first and second wires 21 and 22 forming the sixth turn, the part of the second wire 22 forming the seventh turn, the part of the second wire 22 forming the eighth turn, the part of the second wire 22 forming the ninth turn, and the part of the second wire 22 forming the tenth turn form the first layer L1. The part of the first wire 21 forming the seventh turn, the part of the first wire 21 forming the eighth turn, the part of the first wire 21 forming the ninth turn, and the part of the first wire 21 forming the tenth turn form the second layer L2.

With this configuration, the twisted wire portion 25 forms two layers, and therefore the number of turns of the coil 20D can be increased and the inductance value can be further improved. The parallel portion 26 may have a one-layer structure.

Figure 7C:
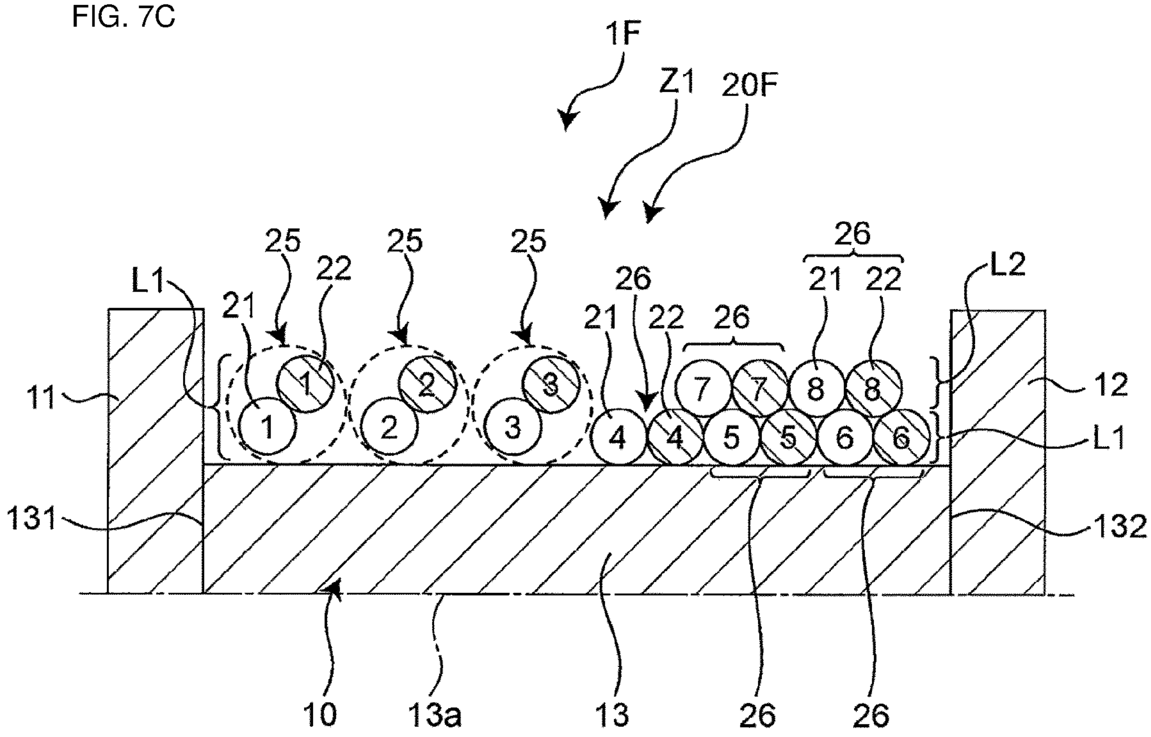
FIG. 7C is a simplified sectional view illustrating a coil component of Second Modification.

FIG. 7C is a simplified sectional view illustrating a coil component of Second Modification. As illustrated in FIG. 7C, a coil component 1F of Second Modification differs from the configuration in FIG. 7A with respect to the configuration of a parallel portion. That is, in the coil component 1F of Second Modification, in the wound region Z1 of a coil 20F, the parallel portion 26 is continuously wound through a plurality of turns around the winding core portion 13 and forms a first layer L1 and is continuously wound through a plurality of turns on top of the first layer L1 and forms a second layer L2.

More specifically, the parallel portion 26 forms the fourth to eighth turns. The fourth to sixth turns form the first layer L1. The seventh and eighth turns form the second layer L2. The twisted wire portion 25 forms the first to third turns and these turns form the first layer L1.

In other words, in a cross section containing the axis 13*a*, the alignment directions of the parts of the first wire 21 and the second wire 22 forming the same turns in the parallel portion 26 are directions that are parallel to the axis 13*a*. More specifically, in a cross section containing the axis 13*a*, the alignment direction of the parts of the first wire 21 and the second wire 22 forming the fourth turn, the alignment direction of the parts of the first wire 21 and the second wire 22 forming the fifth turn, the alignment direction of the parts of the first wire 21 and the second wire 22 forming the sixth turn, the alignment direction of the parts of the first wire 21 and the second wire 22 forming the seventh turn, and the alignment direction of the parts of the first wire 21 and the second wire 22 forming the eighth turn are parallel to each other and are parallel to the axis 13*a*.

With this configuration, the parallel portion 26 forms two layers, and therefore the number of turns of the coil 20F can be increased and the inductance value can be further improved.

In addition, another modification of the coil component will be described. Although not illustrated, in the wound region Z1, either one of the twisted wire portion 25 and the parallel portion 26 is continuously wound through a plurality of turns around the winding core portion 13 and forms a first layer L1, and the other one out of the twisted wire portion 25 and the parallel portion 26 is continuously wound through a plurality of turns on top of the first layer L1 and forms a second layer L2. In the wound region Z1, there may be a mixture of a region in which the first layer L1 is formed of the twisted wire portion 25 and the second layer L2 is formed of the parallel portion 26 and a region in which the first layer L1 is formed of the parallel portion 26 and the second layer L2 is formed of the twisted wire portion 25.

With this configuration, the twisted wire portion 25 and the parallel portion 26 form a two-layer structure and therefore the number of turns of the coil can be increased and the inductance value can be further improved. In addition, the twisted wire portion 25 and the parallel portion 26 can be increased and the mode conversion characteristics can be improved while increasing the number of turns of the coil.

Fifth Embodiment

Figure 8:
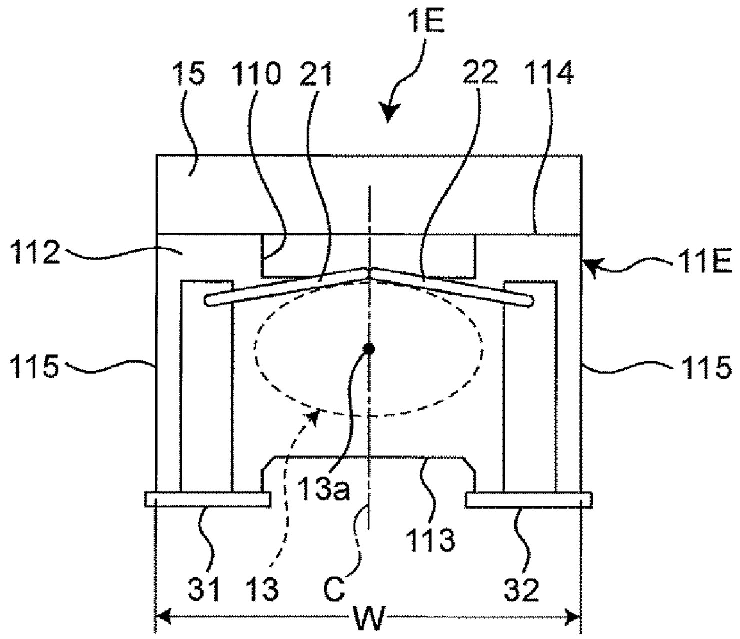
FIG. 8 is an end view seen from an outer surface side of a first flange portion and illustrating a coil component of Fifth Embodiment.

FIG. 8 is an end view seen from an outer surface side of a first flange portion and illustrating a coil component of Fifth Embodiment. Fifth Embodiment differs from First Embodiment with respect to the lead out positions of the wires and the configuration of the flange portions. The differences will be described below. The rest of the configuration is the same as that of First Embodiment, and parts that are the same as in First Embodiment are denoted by the same symbols and description thereof is omitted.

As illustrated in FIG. 8, in a coil component 1E of Fifth Embodiment, the first electrode portion 31 and the second electrode portion 32 are symmetrically disposed with respect to a center position C in a lateral width W of a first flange portion 11E when viewed in a direction along the axis 13*a*. The lateral width W refers to the dimension between side surfaces 115 and 115 on the left and right sides of the first flange portion 11E. When viewed in a direction along the axis 13*a*, the first wire 21 is led out to the first electrode portion 31 from the center position C in the lateral width W of the first flange portion 11E of the winding core portion 13 and the second wire 22 is led out to the second electrode portion 32 from the center position C in the lateral width W of the first flange portion 11E of the winding core portion 13.

More specifically, the first flange portion 11E has a groove 110 that is open at the inner surface 111, the outer surface 112, and the upper surface 114. The first wire 21 and the second wire 22 are led out from the winding core portion 13 via the groove 110 to the first and second electrode portions 31 and 32. The first wire 21 is connected to a part of the first electrode portion 31 provided on the outer surface 112 and the second wire 22 is connected to the part of the second electrode portion 32 provided on the outer surface 112.

With this configuration, the lead out length of the first wire 21 from the winding core portion 13 to the first electrode portion 31 and the lead out length of the second wire 22 from the winding core portion 13 to the second electrode portion 32 can be made the same as each other and the mode conversion characteristics can be further improved.

Furthermore, the first wire 21 is connected to the part of the first electrode portion 31 on the outer surface 112 and is not connected to the part of the first electrode portion 31 on the lower surface 113, which is the mounting surface, and therefore contact between the first wire 21 and solder can be reduced. Thus, damage to the first wire 21 during mounting and reliability testing is reduced and the risk of the first wire 21 breaking is reduced. The first electrode portion 31 may be provided continuously across the upper surface 114, the outer surface 112, and the lower surface 113 of the first flange portion 11, and in this case, contact between the first wire 21 and solder can be further reduced by connecting the first wire 21 to the part of the first electrode portion 31 provided on the upper surface 114.

Similarly, the second wire 22 is connected to the part of the second electrode portion 32 on the outer surface 112 and is not connected to the part of the second electrode portion 32 on the lower surface 113, which is the mounting surface, and therefore contact between the second wire 22 and solder can be reduced.

Although not illustrated, the second flange portion is configured similarly to the first flange portion 11E. In other words, when viewed in a direction along the axis 13*a*, the third electrode portion 33 and the fourth electrode portion 34 are symmetrically disposed with respect to a center position in the lateral width of the second flange portion and the first wire 21 and the second wire 22 are led out to the third electrode portion 33 and the fourth electrode portion 34 from the center position in the lateral width of the second flange portion of the winding core portion 13.

With this configuration, the lead out length of the first wire 21 from the winding core portion 13 to the third electrode portion 33 and the lead out length of the second wire 22 from the winding core portion 13 to the fourth electrode portion 34 can be made the same as each other and the mode conversion characteristics can be further improved.

The present disclosure is not limited to the above-described embodiments and design changes can be made within a range that does not depart from the gist of the present disclosure. For example, the characteristic features of First to Fifth Embodiments may be combined with each other in various ways.

In the above-described embodiments, the coil component is used as a common mode choke coil, but, for example, may instead be used as a winding type coil in which a plurality of wires are wound around a winding core portion such as a transformer or a coupled inductor array. Reducing inter-wire capacitances is also useful in these winding type coils.

In the above-described embodiments, a plate member is provided, but the plate member may be omitted. In the above-described embodiments, the coil includes two wires, but it is sufficient that the coil include a plurality of wires and the coil may include three or more wires. In this case, the twisted wire portion is also not limited to having a configuration in which two wires are twisted together, and may instead have a configuration in which three or more wires are twisted together. Furthermore, the number of electrode portions may be increased as the number of the wires is increased.

In the above-described embodiments, at least one out of the twisted wire portion and the parallel portion is wound around the winding core portion in one layer or two layers, but at least one out of the twisted wire portion and the parallel portion may be wound around the winding core portion in three or more layers.

In the above-described embodiments, the twisted wire portion is located in a region where the wires are wound around the winding core portion, but may be located in a region where the wires are not wound around the winding core portion. For example, the twisted wire portion may be located in a non-wound region between the electrode portions and the winding core portion.

What is claimed is:

1. A coil component comprising:

a core having a winding core portion; and a coil wound along an axis of the winding core portion and including a plurality of wires, wherein the coil has a wound region in which the plurality of wires are wound around the winding core portion, and the wound region includes a twisted wire portion in which the plurality of wires are twisted together and a parallel portion in which the plurality of wires are not twisted together and extend parallel to each other, the twisted wire portion is at both ends of the wound region and only the parallel portion is in a central portion of the wound region that is between the both ends of the wound region.

2. The coil component according to claim 1, wherein the parallel portion is continuously wound through at least one turn around the winding core portion.

3. The coil component according to claim 1, wherein a number of twists of the twisted wire portion in the coil as a whole is a natural number.

4. The coil component according to claim 1, wherein the core includes a first flange portion at a first end of the winding core portion and a second flange portion at a second end of the winding core portion, the core further includes a plurality of electrode portions on the first flange portion and connected to the coil and a plurality of electrode portions provided on the second flange portion and connected to the coil, in the wound region, at least part of the twisted wire portion is located at a position nearest at least one out of the first end and the second end of the winding core portion.

5. The coil component according to claim 1, wherein the twisted wire portion is continuously wound through at least one turn around the winding core portion, and a number of twists of the twisted wire portion continuously wound through at least one turn around the winding core portion is one or more.

6. The coil component according to claim 1, wherein the core includes a first flange portion provided at a first end of the winding core portion and a second flange portion provided at a second end of the winding core portion, the core further includes a first electrode portion and a second electrode portion provided on the first flange portion and a third electrode portion and a fourth electrode portion provided on the second flange portion, the coil includes a first wire electrically connected to the first electrode portion and the third electrode portion and a second wire electrically connected to the second electrode portion and the fourth electrode portion, when viewed in a direction along the axis, the first electrode portion and the second electrode portion are symmetrically disposed with respect to a center position in a lateral width of the first flange portion and the first wire and the second wire are led out to the first electrode portion and the second electrode portion from the center position in the lateral width of the first flange portion of the winding core portion, and when viewed in a direction along the axis, the third electrode portion and the fourth electrode portion are symmetrically disposed with respect to a center position in a lateral width of the second flange portion and the first wire and the second wire are led out to the third electrode portion and the fourth electrode portion from the center position in the lateral width of the second flange portion of the winding core portion.

7. The coil component according to claim 5, wherein the parallel portion is continuously wound through at least one turn around the winding core portion.

8. The coil component according to claim 5, wherein a number of twists of the twisted wire portion in the coil as a whole is a natural number.

9. The coil component according to claim 5, wherein the core includes a first flange portion at a first end of the winding core portion and a second flange portion at a second end of the winding core portion, the core further includes a plurality of electrode portions on the first flange portion and connected to the coil and a plurality of electrode portions provided on the second flange portion and connected to the coil, in the wound region, at least part of the twisted wire portion is located at a position nearest at least one out of the first end and the second end of the winding core portion.

10. The coil component according to claim 5, wherein the core includes a first flange portion provided at a first end of the winding core portion and a second flange portion provided at a second end of the winding core portion, the core further includes a first electrode portion and a second electrode portion provided on the first flange portion and a third electrode portion and a fourth electrode portion provided on the second flange portion, the coil includes a first wire electrically connected to the first electrode portion and the third electrode portion and a second wire electrically connected to the second electrode portion and the fourth electrode portion, when viewed in a direction along the axis, the first electrode portion and the second electrode portion are symmetrically disposed with respect to a center position in a lateral width of the first flange portion and the first wire and the second wire are led out to the first electrode portion and the second electrode portion from the center position in the lateral width of the first flange portion of the winding core portion, and when viewed in a direction along the axis, the third electrode portion and the fourth electrode portion are symmetrically disposed with respect to a center position in a lateral width of the second flange portion and the first wire and the second wire are led out to the third electrode portion and the fourth electrode portion from the center position in the lateral width of the second flange portion of the winding core portion.

* * * * *